(12) United States Patent
Goodrick

(10) Patent No.: US 7,575,508 B2
(45) Date of Patent: Aug. 18, 2009

(54) PROCESSING FISH INCLUDING ROTATION THEREOF

(75) Inventor: Bruce Goodrick, Sheldon (AU)

(73) Assignee: Seafood Innovations Pty Ltd, Sheldon (AU)

( * ) Notice: Subject to any disclaimer, the term of this patent is extended or adjusted under 35 U.S.C. 154(b) by 0 days.

(21) Appl. No.: 12/282,245

(22) PCT Filed: Mar. 9, 2007

(86) PCT No.: PCT/AU2007/000298

§ 371 (c)(1),
(2), (4) Date: Sep. 9, 2008

(87) PCT Pub. No.: WO2007/101313

PCT Pub. Date: Sep. 13, 2007

(65) Prior Publication Data

US 2009/0156109 A1    Jun. 18, 2009

(30) Foreign Application Priority Data

Mar. 9, 2006    (AU) ............................. 2006901203
Jun. 16, 2006   (AU) ............................. 2006903253

(51) Int. Cl.
    *A22B 3/00*    (2006.01)
(52) U.S. Cl. ...................................................... 452/57
(58) Field of Classification Search ................ 452/150, 452/155, 160–164; 198/400, 411, 412
See application file for complete search history.

(56) References Cited

U.S. PATENT DOCUMENTS

| 1,689,919 | A |   | 10/1928 | Heath |
| 3,232,412 | A |   | 2/1966  | Bloss |
| 3,514,811 | A |   | 6/1970  | West |
| 4,918,788 | A | * | 4/1990  | Passchier ................ 452/135 |
| 7,056,202 | B2 | * | 6/2006 | Pein ......................... 452/161 |

FOREIGN PATENT DOCUMENTS

| GB | 878055      |    | 9/1961  |
| SU | 1685357 A1  |    | 10/1991 |

* cited by examiner

Primary Examiner—Thomas Price
(74) Attorney, Agent, or Firm—Hoffman & Baron, LLP

(57) ABSTRACT

A fish processing system comprising a first fish guide having an entrance for receiving the fish. A striker coupled at one end of the first fish guide, the striker having a first holder that holds and releases the fish and is configured to apply a blow to the fish. A channel coupled at another end to the striker, the channel having an internal passage that rotates the fish substantially about a longitudinal axis of the channel. A bleeder coupled at an opposite end of the channel, the bleeder having a second holder that holds and releases the fish and is configured to sever a throat blood vessel and/or a gill arch of the fish, and a second fish guide coupled to the bleeder, the second fish guide includes an exit for delivering the processed fish.

20 Claims, 13 Drawing Sheets

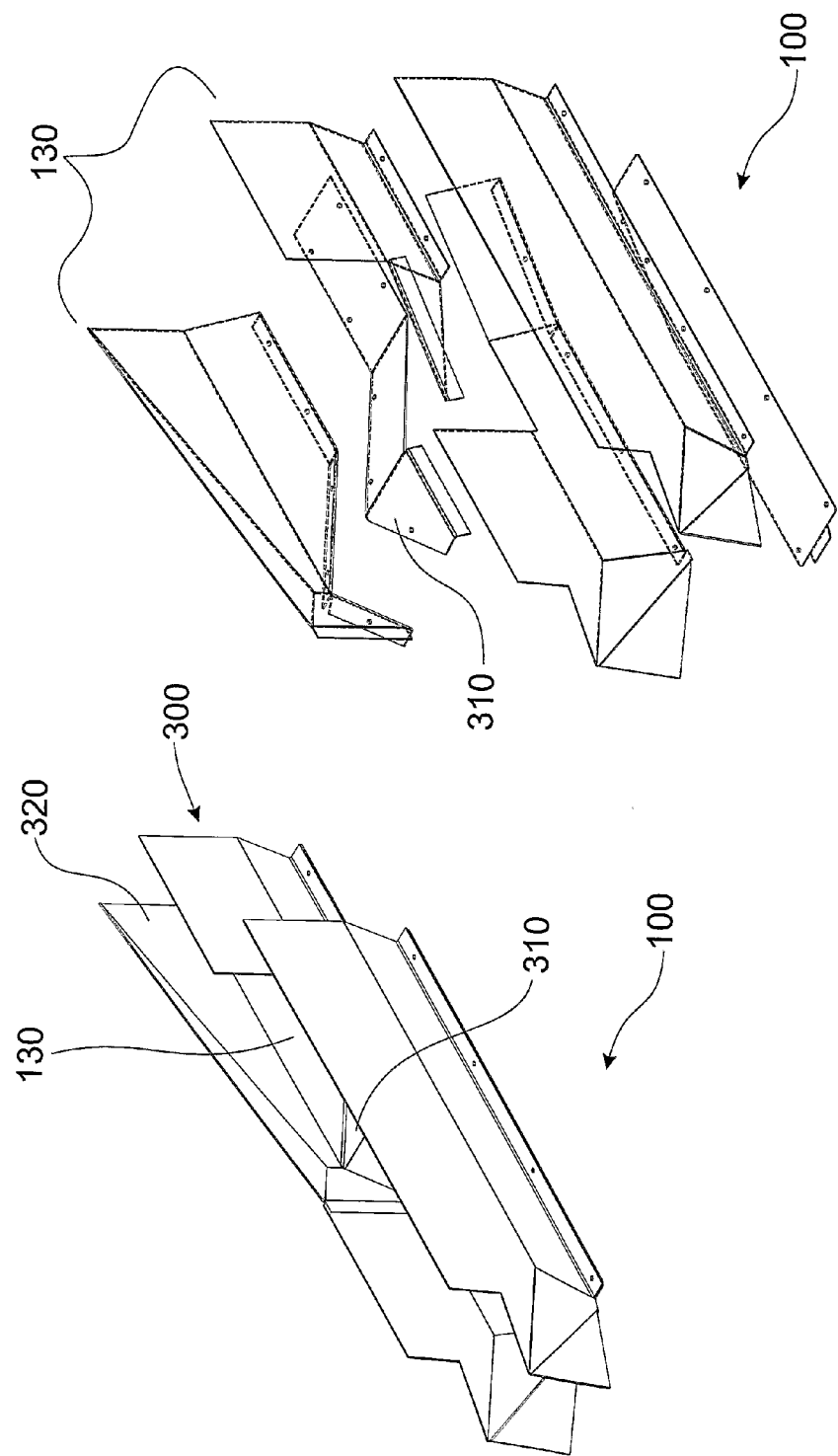

PROCESSING FISH INCLUDING ROTATION THEREOF

FIELD OF THE INVENTION

The present invention relates to a fish processing device. In particular, although not exclusively, the invention relates to a fish processing device incorporating a fish rotation device.

DESCRIPTION OF THE PRIOR ART

In the commercial world of fisheries and aquaculture, there are a number of methods used to ensure fish are correctly slaughtered and the optimum quality of fish is available to the public. One such method includes stunning fish. Fish are stunned shortly after harvesting to reduce lactic acid build-up due to stress that a fish may experience after being removed from the water. Eliminating lactic acid build-up in a fish significantly assists in preserving the quality of the fish.

Another known method includes bleeding fish. Although a fish is dead, their heart continues to function for some time afterwards. By bleeding a fish, the heart pumps blood to the cut or source of the bleeding. This prevents an accumulation of blood in the flesh which may cause discolouring and jeopardise the flavour or texture of the fish. Furthermore, the bleeding process allows blood of the fish to drains, thereby minimising bleeding and odours in preparation of the fish for eating.

Of the prior art in the field, International Patent Application WO 98/44805 by Hitchins and assigned to INDAC LTD., refers to an apparatus which combines these known methods. Specifically, the disclosure refers to a spike that penetrates a fish's skull and a cutting device that cuts the throat of the fish. Whilst Hitchins discloses a method of stunning and bleeding a fish, the described method is considered crude and compromises the appearance of the fish.

Japanese Patent Application JP2000-125757 assigned to Global Cosmos KK, discloses a fish processing system which fillets a fish into two pieces. A fish on a conveyor is filleted by pneumatic driven blades, which cuts the fish from behind and away from the operculums. Although this disclosure provides a streamline system for filleting fish, the vast majority of consumers prefer unprocessed and un-filleted fish.

In light of the prior art, it is an object of the present invention to at least ameliorate the disadvantages and shortcomings of the prior art, or at least provide the public with a useful alternative. Further objects will be evident from the following description.

SUMMARY OF THE INVENTION

In one form, although it need not be the only, or indeed the broadest form, the invention resides in a fish rotation device, the device comprising:

a channel having an entrance for receiving the fish;
an intermediate section for rotating the fish; and
an exit for delivering the fish.

The device may rotate the fish substantially about a longitudinal axis of the channel.

The channel may comprise an internal passage which may be fully or partially enclosed.

Preferably, the internal passage has a cross-sectional shape that substantially conforms to a cross-sectional shape of the fish.

Preferably, the channel is oriented at an angle, wherein the entrance is elevated with respect to the exit.

In another form, the invention resides in a fish rotation device, the device comprising:

a channel having an entrance for receiving the fish;
the channel includes an intermediate section having an internal passage which causes a rotation of the fish substantially about a longitudinal axis of the channel;
the channel includes an exit for delivering the rotated fish;
wherein the entrance, the exit and the internal passage having a cross-sectional shape that substantially conforms to a cross-sectional shape of the fish.

Preferably, the device rotates the fish through 180 degrees between the entrance and the exit. However, the device may also rotate the fish through any angle in the range from about 90 to about 270 degrees.

Preferably, the device includes an entrance flange and an exit flange.

In yet another form, the invention resides in a fish processing system, the system comprising:

a first fish guide having an entrance for receiving the fish;
a striker coupled to the first fish guide, the striker having a first holder that holds and releases the fish and is configured to apply a blow to the fish;
a channel coupled to the striker, the channel having an intermediate section that rotates the fish substantially about a longitudinal axis of the channel;
a bleeder coupled to the channel, the bleeder having a second holder that holds and releases the fish and is configured to sever a blood vessel of the fish; and
a second fish guide coupled to the bleeder, the second fish guide having an exit for delivering the fish.

Preferably, the channel includes an entrance and an exit.

The entrance, the exit and the intermediate section have a cross-sectional shape that substantially conforms to a cross-sectional shape of the fish.

Preferably, the striker is configured to stun the fish by applying a blow to the head of the fish.

Preferably, the bleeder includes a piercer that severs the throat blood vessel and/or the gill arch of the fish.

Preferably, the striker and the bleeder include a cylinder, and a piston, the piston movable between a retracted position and an extended position;

Preferably, the striker and the bleeder include a trigger to cause the piston to be moved from the retracted position to the extended position.

Preferably, the striker and the bleeder include a head, a main body and a foot.

The head may include a control chamber that is linked to a control port. A control piston valve may be mounted within the head and may be movable between a contact position and a non-contact position.

The main body may include a low-pressure chamber that is linked to a low-pressure inlet port and a high-pressure chamber that is linked to a high-pressure inlet port.

The foot may include an aperture through which the piston extends when in the extended position.

Preferably, the fish moves in a unidirectional path.

BRIEF DESCRIPTION OF THE DRAWINGS

In order that the present invention may be readily understood and put into practical effect, reference will now be made to the accompanying illustrations wherein:

FIG. 16 is a perspective view of a fish rotation device according to another embodiment of the invention;

FIG. 17 is an exploded view of the fish rotation device of FIG. 16.

DETAILED DESCRIPTION OF THE DRAWINGS

Figure 1:
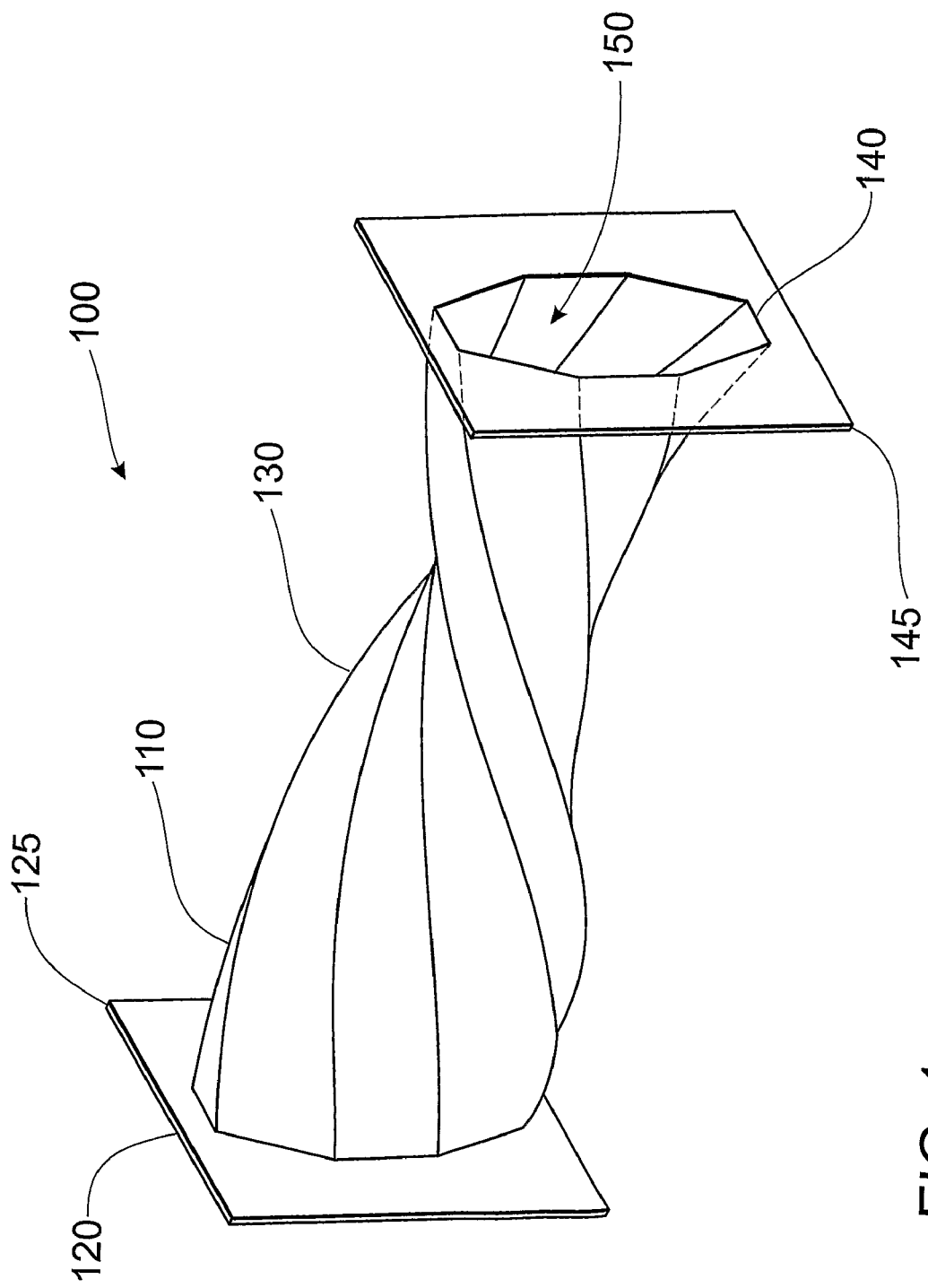
FIG. 1 is a perspective view of a fish rotation device according to one embodiment of the invention.

Throughout the detailed description of the drawings, like reference numerals refer to like parts.

Figure 2:
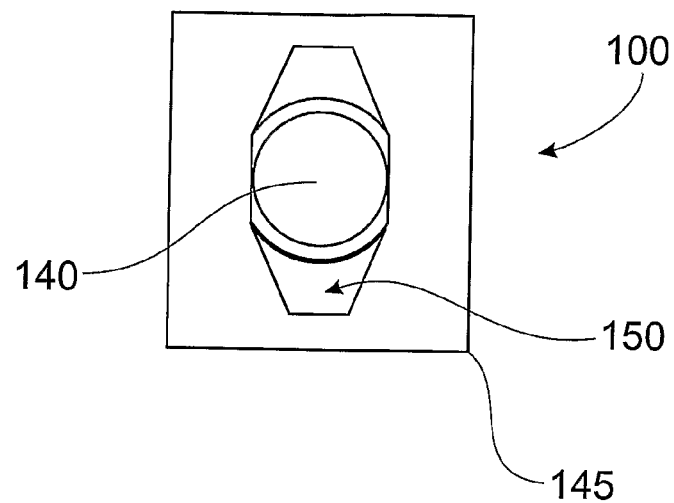
FIG. 2 is a front elevation view of the fish rotation device.
Figure 3:
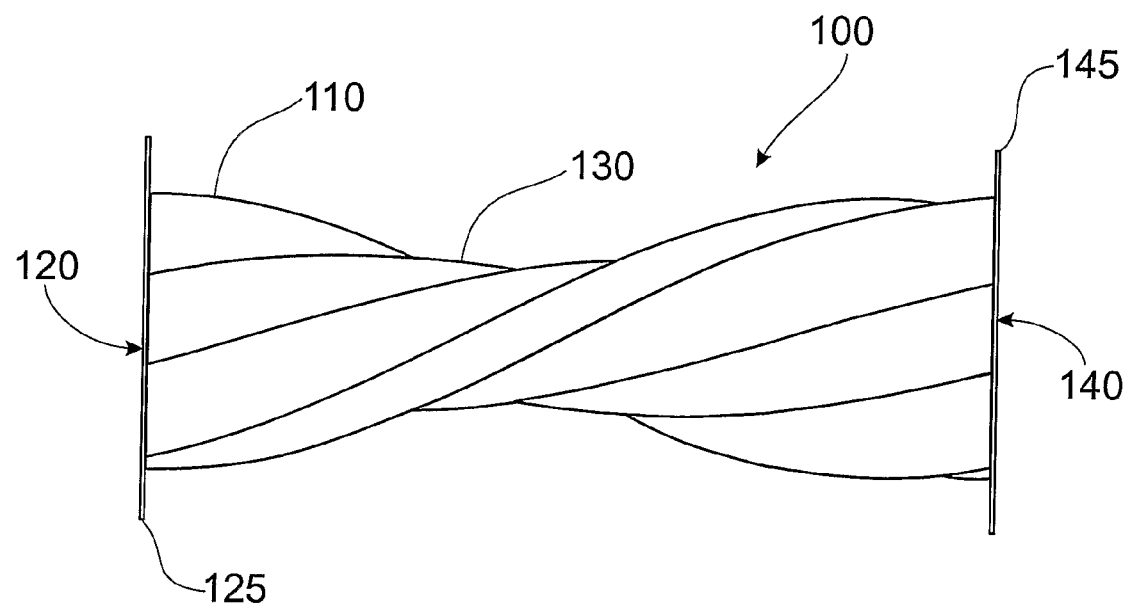
FIG. 3 is a side elevation view of the fish rotation device.

FIGS. 1 to 3 show a fish rotation device 100 according to an embodiment of the invention. The fish rotation device 100 comprises a channel 110 having an entrance 120, an intermediate section 130 and an exit 140.

The fish rotation device 100 includes an entrance flange 125 and an exit flange 145. The entrance flange 125 and the exit flange 145 allow the fish rotation device 100 to be mounted as required.

The entrance 120 and the exit 140 are elongated in shape. As a person skilled in the art would appreciate, the entrance 120 and the exit 140 can be formed in a number of shapes and sizes. For example, the entrance 120 and the exit 140 can be oval or rectangular in shape. In this embodiment of the invention, the entrance 120 and the exit 140 conform to a cross-sectional shape which would accept a fish in an upright position, either oriented with the belly (or underside or stomach) facing down, or with the belly facing upwardly. Furthermore, the fish rotation device 100 will receive fish either head first or tail first.

The intermediate section 130 of the channel 110 forms an internal passage 150. The internal passage 150 has a cross-sectional shape that substantially conforms to a cross-section of the entrance 120 and the exit 140. The intermediate section 130 has a twisting the internal passage 150 about a longitudinal axis of the channel 110, such that the internal passage 150 rotates through 180 degrees between the entrance 120 and the exit 140.

Although the embodiment shows the intermediate section forming an enclosed internal passage the invention is not limited to this structure. The internal passage may be only partially enclosed or formed from rods or slats defining an open passage.

The channel 110 is oriented in a descending direction, such that the entrance 120 and the entrance flange 125 are elevated with respect to the exit 140 and the exit flange 145.

Whilst the fish rotation device 100 is made from fibreglass, it can be appreciated the fish rotation device 100 can be made from molded plastic or any other materials considered suitable.

In use, a fish enters the entrance 120 of the fish rotation device 100 in an upright orientation (underside or stomach facing down). Given the configuration of the internal passage 150, the fish is substantially restricted within the internal passage 150. As the fish passes through the intermediate section 130, the path and orientation of the fish follows the internal passage 150. As such, the fish rotation device 100 rotates the fish through 180 degrees between the entrance 120 and the exit 140.

It can be appreciate that other embodiments of the invention can include the channel 110 configured to rotate fish at a number of different angles. For example, the channel 110 can be configured to rotate the fish approximately 90 degrees, approximately 270 degrees or any angle within this range.

Other embodiments of the invention can include the channel 110 configured to be substantially "U-shaped" or substantially enclosed. In these embodiments, the entrance 120, the internal passage 150 and the exit 140 are configured to a uniform shape.

The intermediate section 130 may rotate the fish using various techniques and the invention is not limited to the specific embodiment of a twisted internal passage 150. For instance, the intermediate section 130 is defined by a straight passage 300 with a deflecting area 310, as shown in FIGS. 16 and 17. As the fish traverses the passage 300 it enters a deflecting area 310 and encounters an angled wall 320 of the deflecting area 310 which knocks the fish onto its side. Another angled wall could cause a further 90 degree rotation if desired.

Water or other suitable fluids can be used with the fish rotation device 100 to minimise friction between the fish and the internal section 130 or the channel 110.

Figure 4:
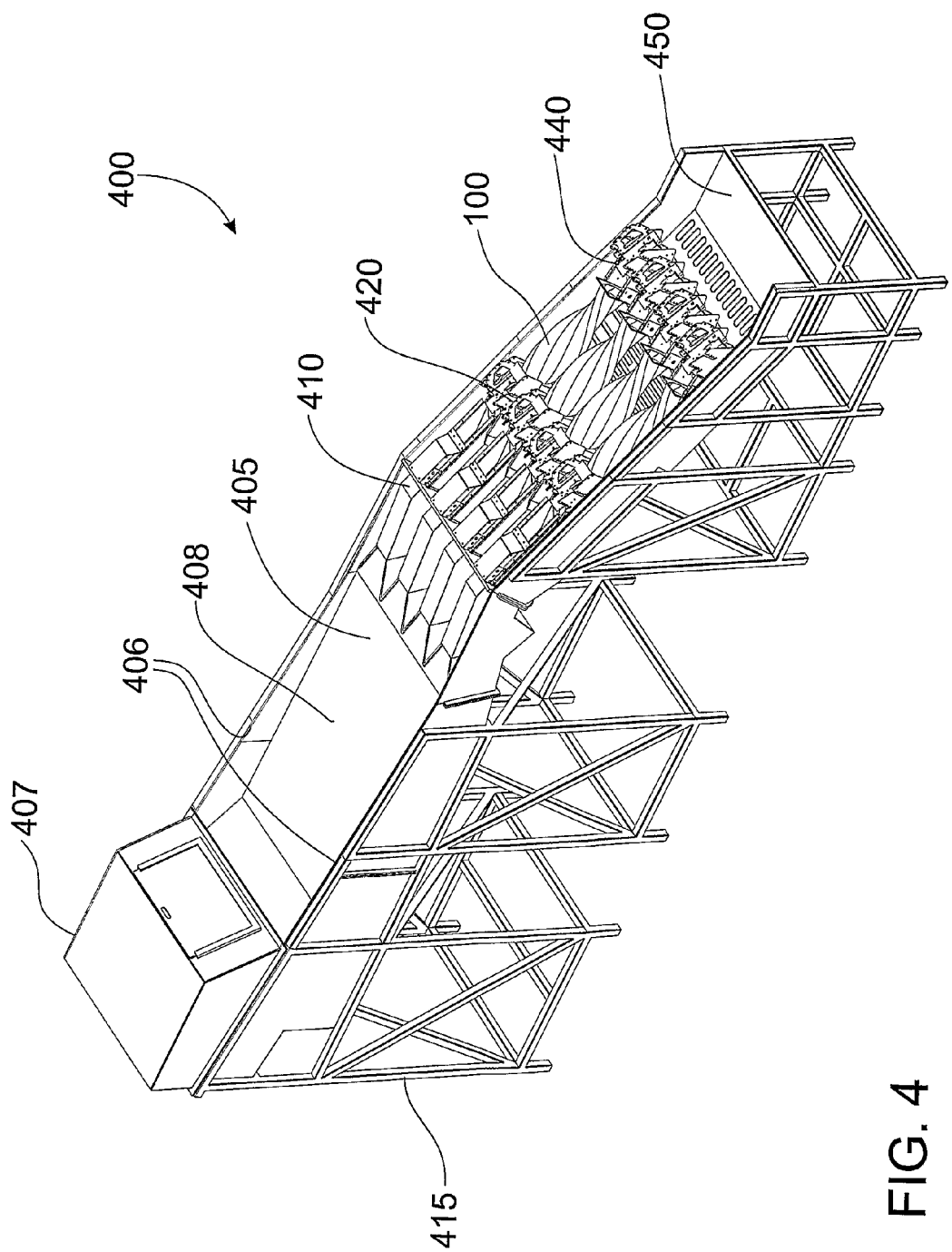
FIG. 4 is a perspective view of a fish processing system according to another embodiment of the invention.

FIG. 4 shows a fish processing system 400 according to another embodiment of the invention. The fish processing system 400 comprises a collection area 405, a first fish guide 410, a striker 420, a fish rotation device 100, a bleeder 440 and a second fish guide 450. The fish processing system 400 is mounted upon a stand 415 configured such that each sequential stage in the fish processing system 400 is cascading or sloping downwards.

The collection area 405 is formed by two sidewalls 406, the first fish guide 410, an entry module 407 and a clear cover (not shown). The entry module 407 initially receives the fish and then releases the fish into the collection area 405. The collection area 405 contains a pool of water which allows a number of fish to congregate prior to processing.

The first fish guide 410 includes non-turbulent water-jet (not shown) which flow water into the collection area 405. The flow generated from the water-jets encourages the fish to swim into the first fish guide 410. Hence, fish enter the first fish guide 410 oriented in an upright position with the belly (or underside or stomach) facing down. The clear cover (not shown) substantially eliminates any spray generated by the water-jets or the fish that may contaminate the work area adjacent the fish processing system 400. The first fish guide 410 is angled on a greater slant than the collection area 405. Whilst not obvious from FIG. 4, the first fish guide 410 is constructed from a substantially "U-shaped" channel which assists in restricting the movement of the fish.

Figure 5:
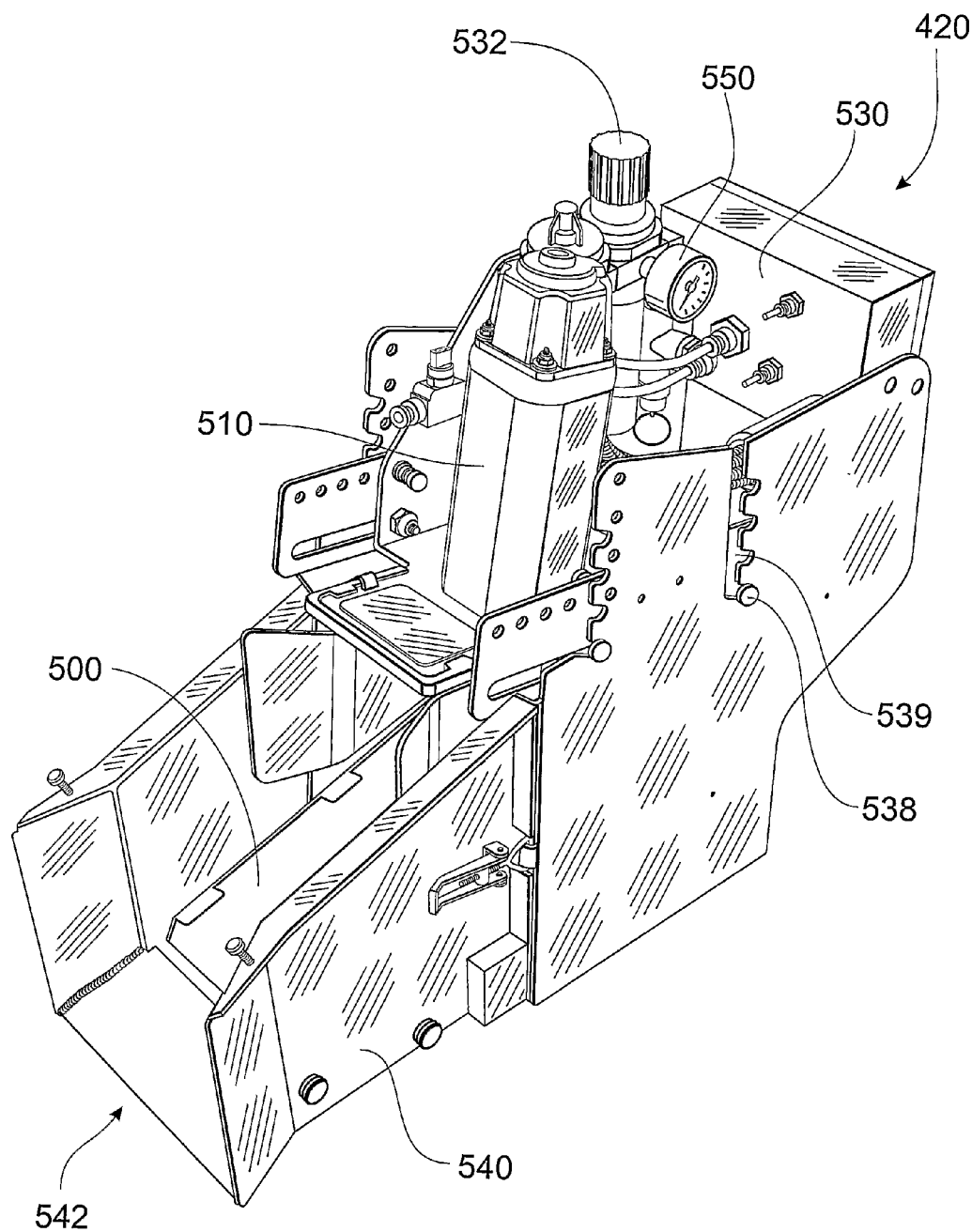
FIG. 5 is a perspective view of a striker of FIG. 4.
Figure 6:
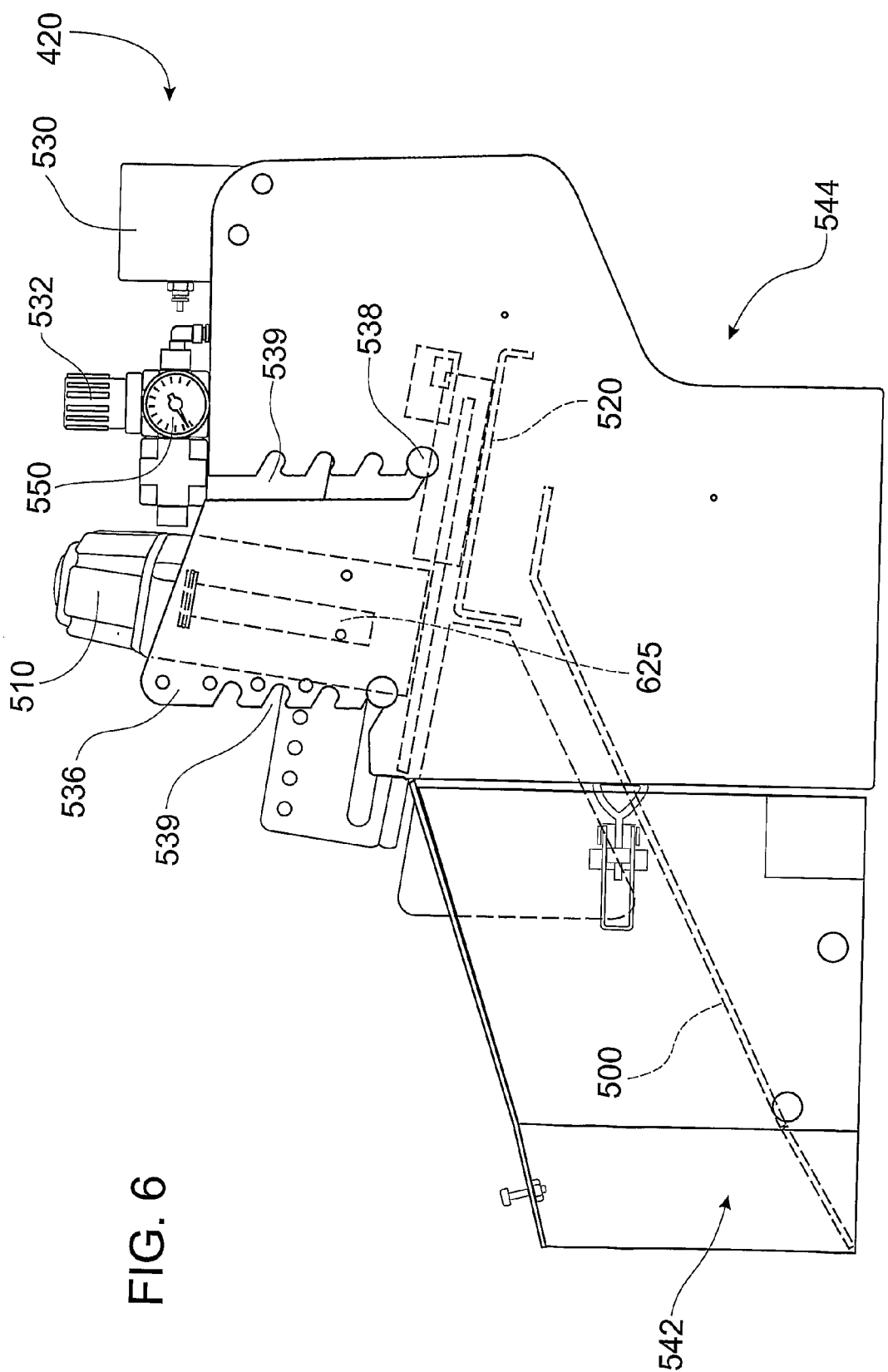
FIG. 6 is a cross-section side view of the striker in a non-contact position.
Figure 7:
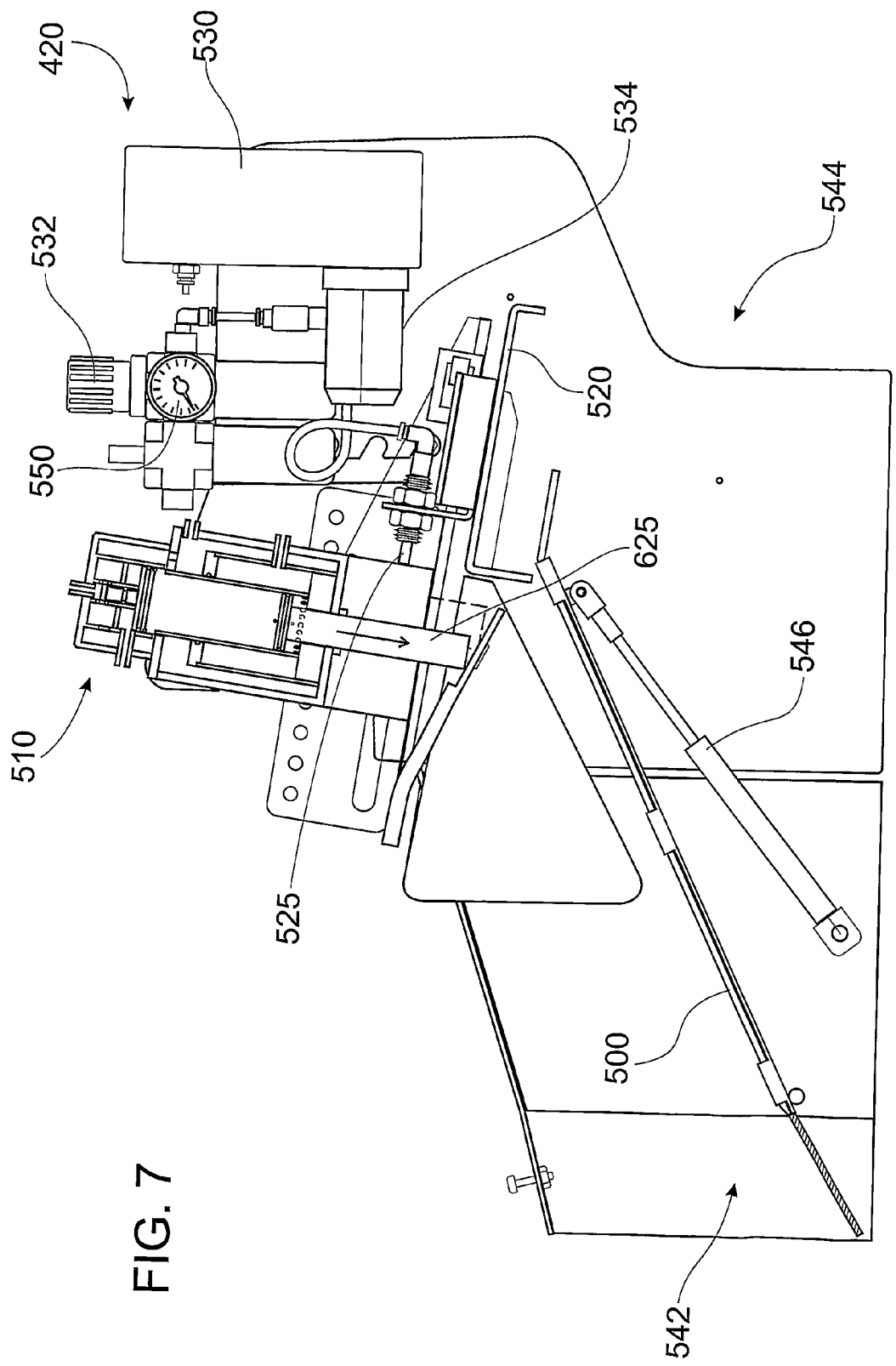
FIG. 7 is a partial cross-section side view of the striker in a contact position.

The striker 420 is the next stage of the fish processing system 400. FIGS. 5 to 7 show the fish striker 420 comprises a base 500, a housing 510 and a trigger 520.

The striker 420 is mounted adjacent the first fish guide 410. The striker 420 includes a control box 530, a regulator 532 and an oiler 534 that are all secured to a mount 536.

The striker 420 includes a pair of side walls 540 adjacent the base 500. The side walls 540 and the base 500 define an entrance 542 in which the fish enters the striker 420. An exit 544 allows the fish to exit the striker 420.

The housing 510 is secured above the base 500 using the mount 536 and pins 538 located on the side walls of the striker 420. The striker 420 includes slots 539 that are used to adjust the height of the housing 510 relative to the base 500.

The base 500 is movable between a first position where the fish enters the striker 420 through the entrance 542, and a second position where the fish exits the striker 420 via the exit 544. The base 500 is moved between the first and second position using a pair of pneumatic rams 546 connected to the underside of the base 546. The combination of the pneumatic rams 546 and the base 500 hold the fish in position.

The trigger 520 is mounted adjacent the housing 510. The trigger 520 is operatively connected to a piston within the housing 510 and the base 500. A piston pin 525 is connected to the trigger 520 to ensure that the trigger 520 is fully engaged when activated.

The housing 510, shown in more detail in FIGS. 8 to 11, is formed from a head 605, a main body 610 and a foot 615.

A pneumatic ram 617 is located within the main body 610 that includes a cylinder 620 and a piston 625 that is reciprocative within the cylinder 620. The piston 625 is made from a single piece of plastic that is easily removable and difficult to break. An O-ring 630 provides a seal between the cylinder 620 and the piston 625. The piston 625 is movable between an extension position and retraction position.

The main body 610 also includes a low-pressure chamber 635 that is linked to a low-pressure inlet port 640 and a high-pressure chamber 645 that is linked to a high-pressure inlet port 650.

The cylinder 620 is in fluid communication with the low-pressure chamber 635 via a ring of holes 655 located at the bottom of the cylinder 620. Two additional holes 660 located at the bottom of the cylinder 620 are also in fluid communication with the low-pressure chamber 635.

The high-pressure chamber 645 extends into the head 605 of the housing 510 via an aperture 665 in the main body 610.

The head 605 includes a control chamber 607 that is linked to a control port 675. A control piston valve 680 is reciprocately mounted within the head 605 and movable between a contact position and a non-contact position. The pressure located within the control chamber 670 controls the movement at the control piston valve 680 between the contact and non-contact positions.

An outlet port 685 is located above the control piston valve 680 and allows air to pass from the head 605. A passageway 687 extends through control piston valve 680 to allow air to pass from the cylinder 620 out the outlet port 685. A seal 689 is located above the passageway 687 to seal the passageway 687 when the control piston valve 680 is in the contact position.

The foot 615 has an aperture 619 through which the piston 625 extends when in the extended position. A Teflon self-lubricating washer 627 is located within the foot to allow smooth reciprocation of the piston.

Figure 8:
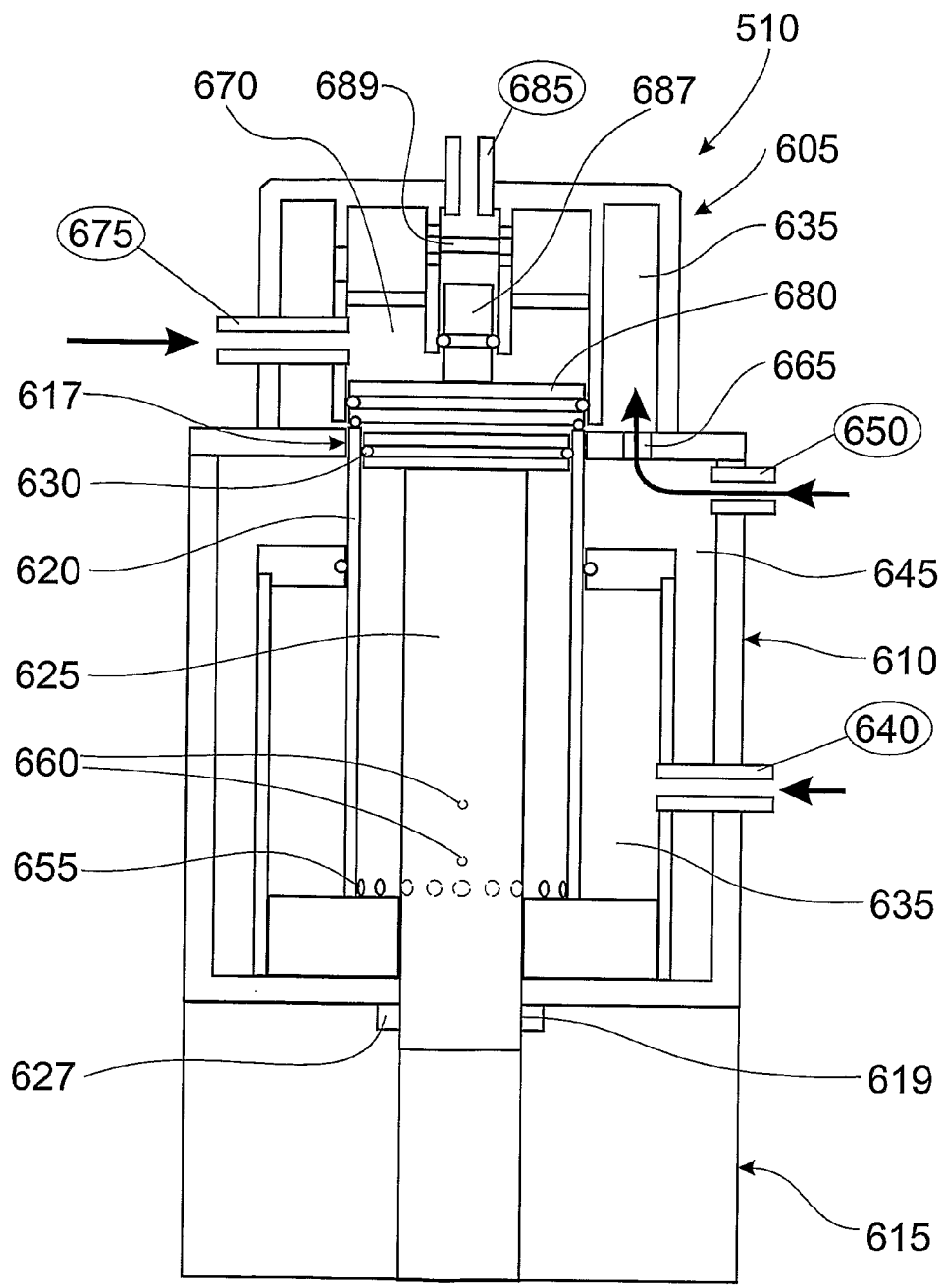
FIG. 8 is a cross-section side view of the striker in first position.

When implemented, the striker stuns the fish by applying a blow to the head of the fish. Initially, the piston 625 starts in the retracted position with the control piston valve 680 in the non-contact position as shown in FIG. 8. The control piston valve 680 is held in the non-contact position by high-pressure air that is fed through the control port 675.

Figure 9:
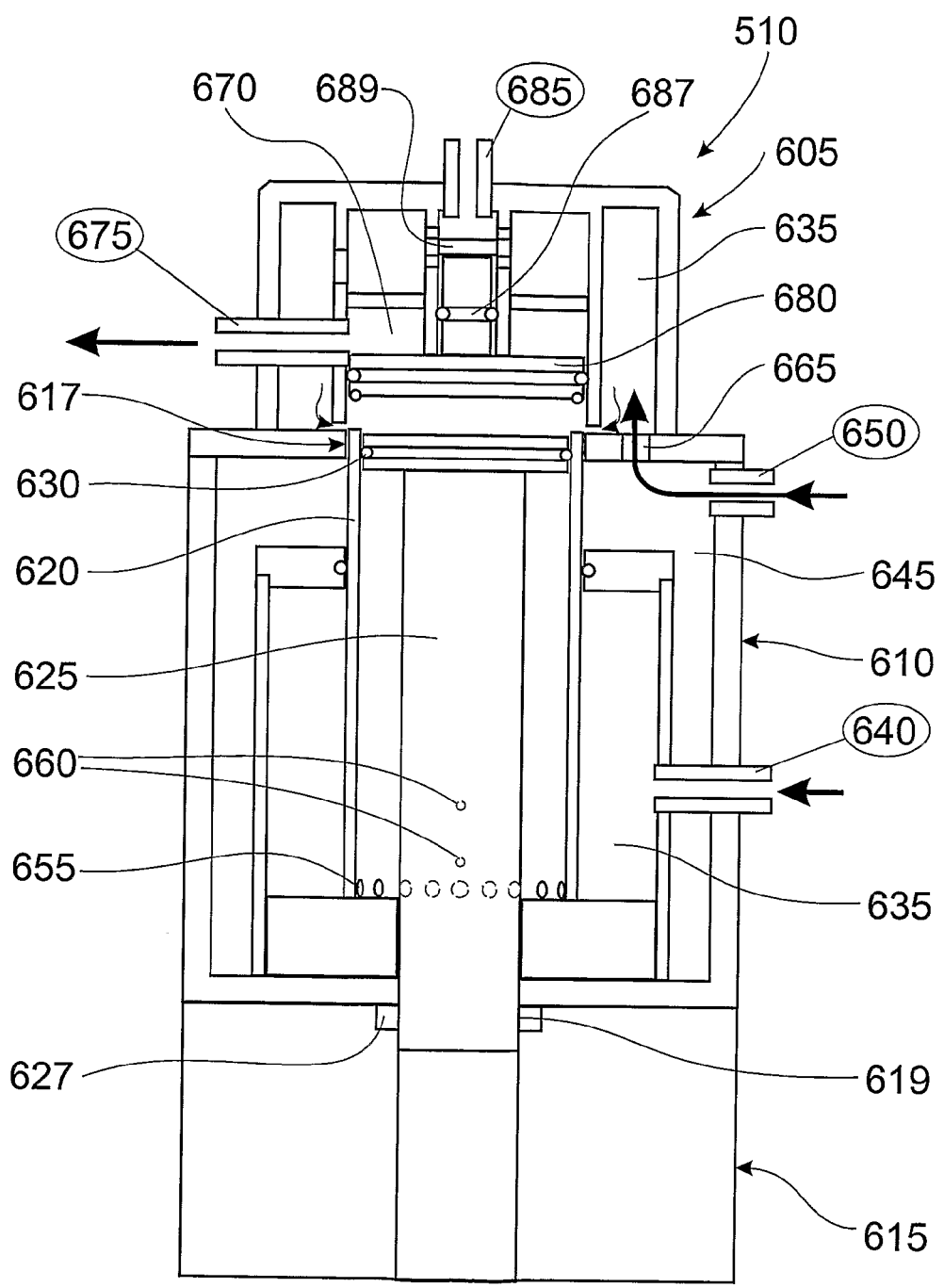
FIG. 9 is a cross-section side view of the striker in a second position.
Figure 10:
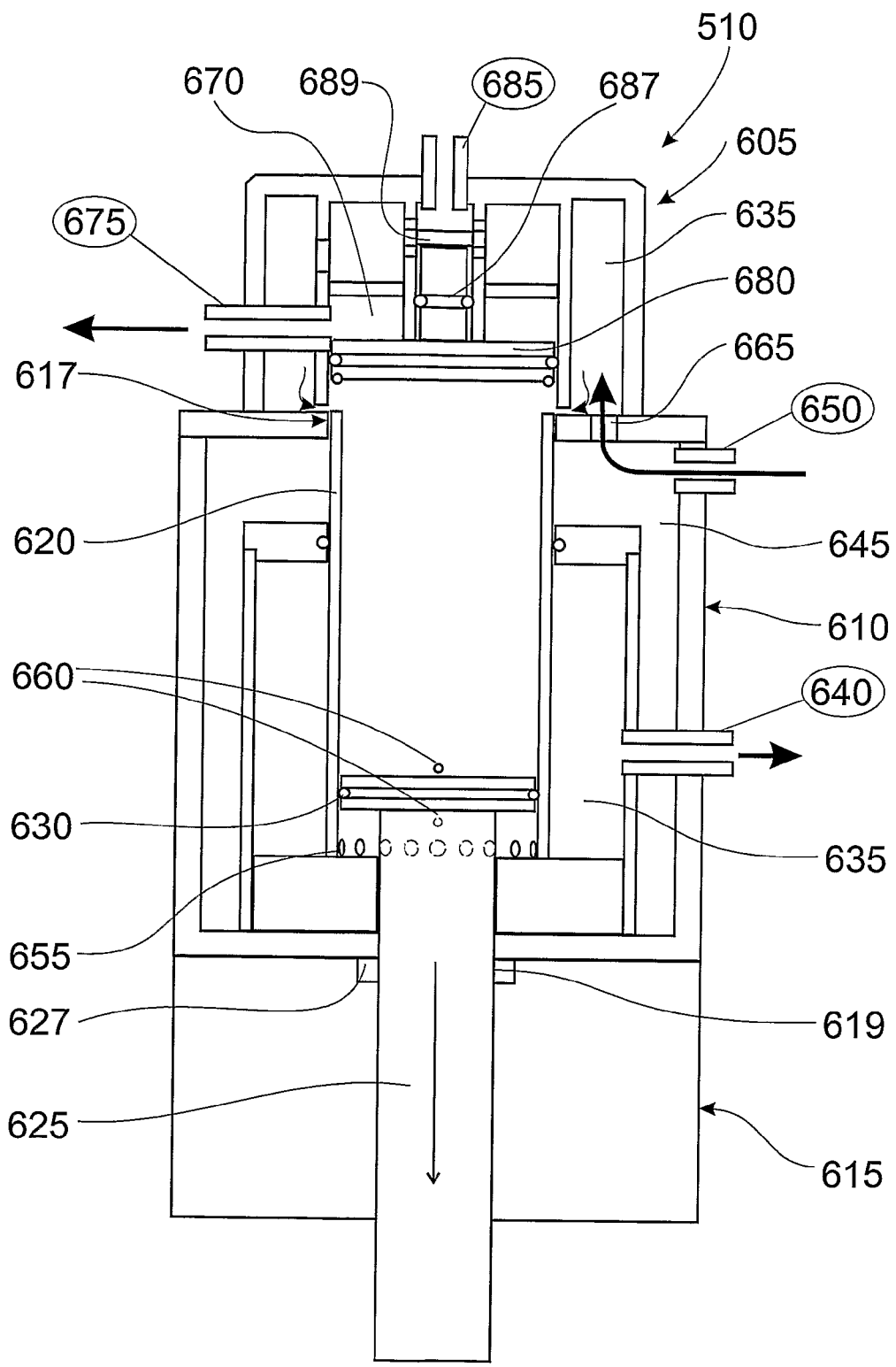
FIG. 10 is a cross-section side view of the striker in a third position.

The control port 675 is opened to allow pressure to be released from the control chamber 670 as shown in FIG. 9. This allows the control piston valve 680 to move into the contact position where the passageway 687 is sealed against the seal 689. High-pressure passes from the high-pressure chamber 635 into the cylinder 620 and causes the piston 625 to move to the extended position as shown in FIG. 10. Air located within the cylinder 620 is passed out of the low-pressure inlet port 640 when the piston 625 travels down the cylinder 620.

When the piston 625 is close to the bottom of the cylinder 620, air is passed through the additional holes 660 located within the cylinder 620. This causes high-pressure air to be passed from within the cylinder 620 into the low-pressure chamber 635.

Figure 11:
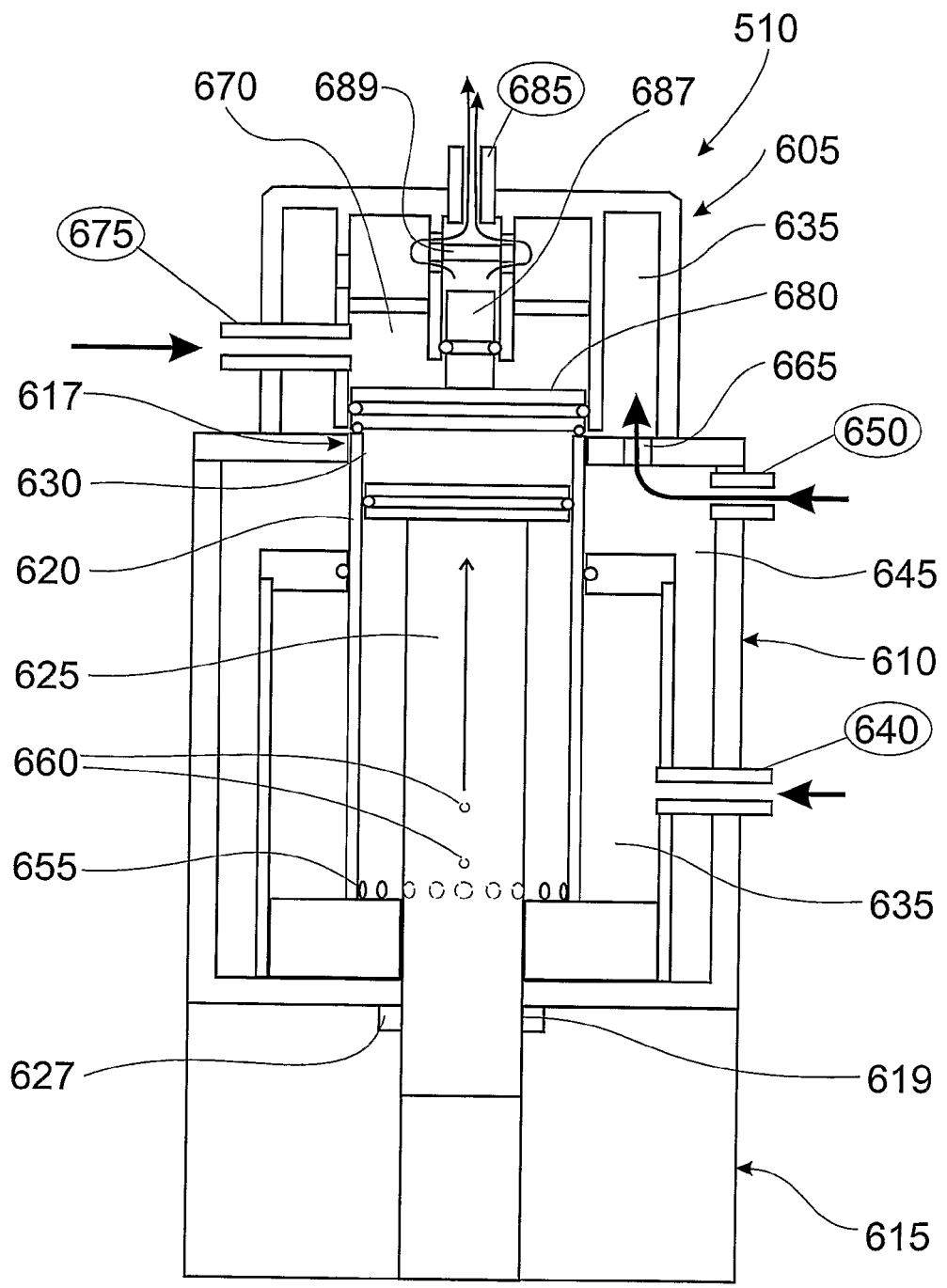
FIG. 11 is a cross-section side view of the striker in a fourth position.
Figure 12:
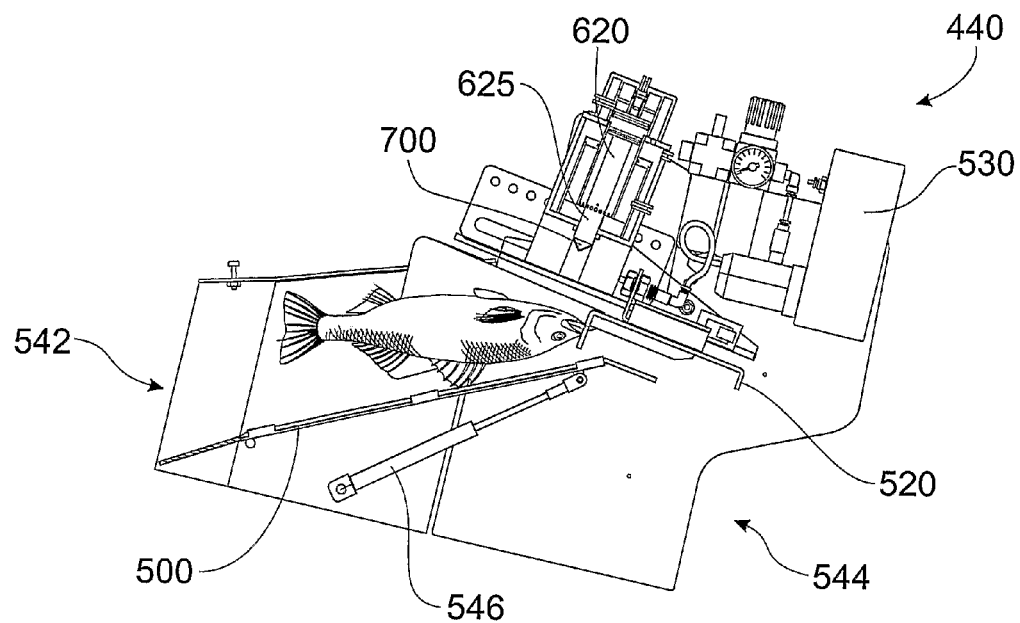
FIG. 12 is a partial cross-section view of a bleeder of FIG. 4 in a first position.
Figure 13:
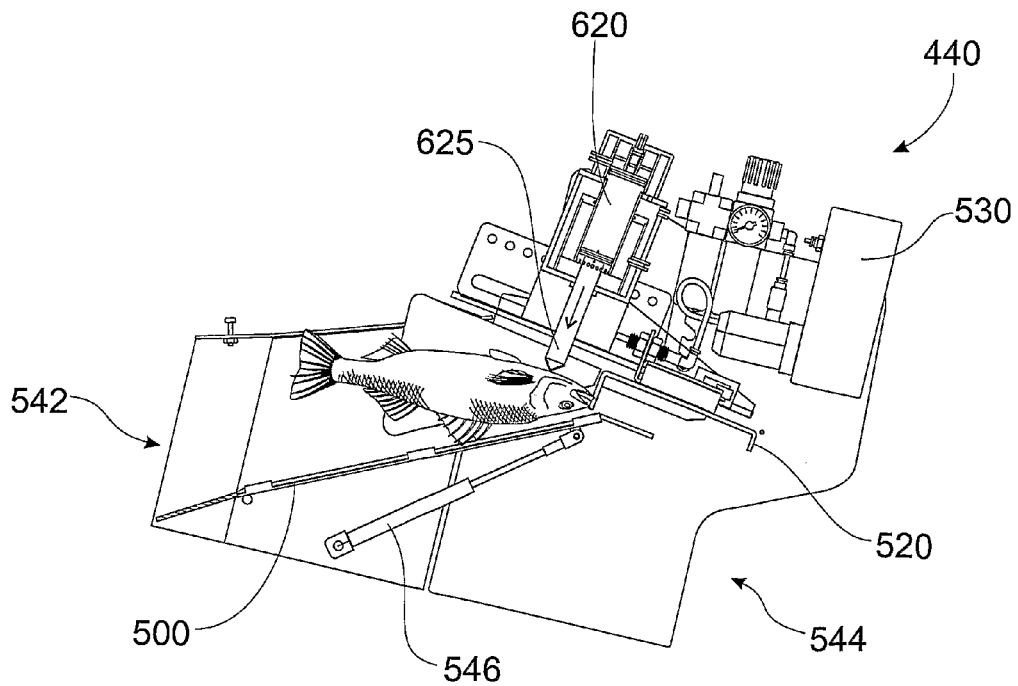
FIG. 13 is a partial cross-section view of the bleeder in a second position.
Figure 14:
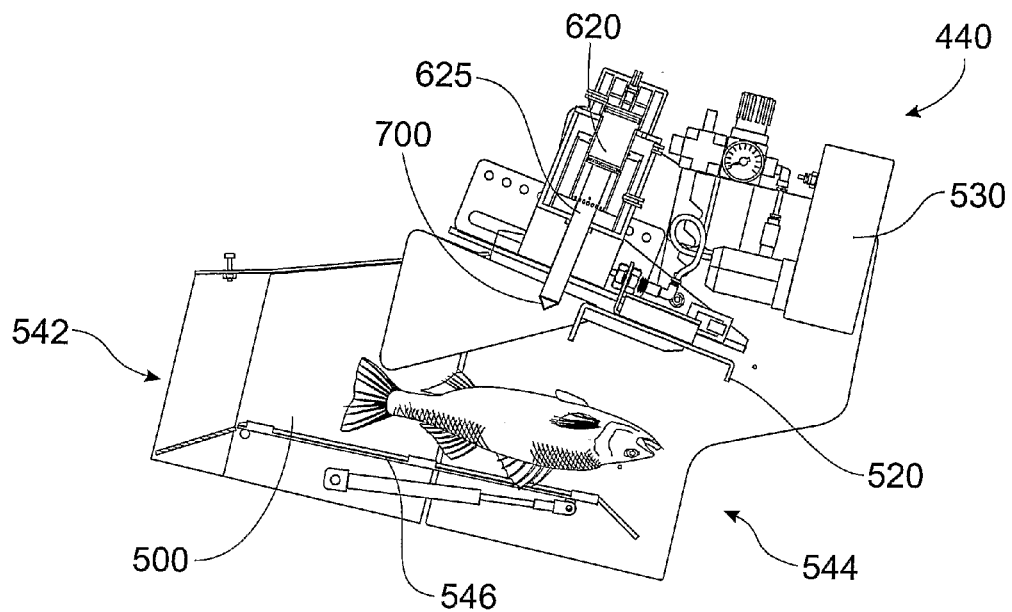
FIG. 14 is a partial cross-section view of the bleeder in a third position.
Figure 15:
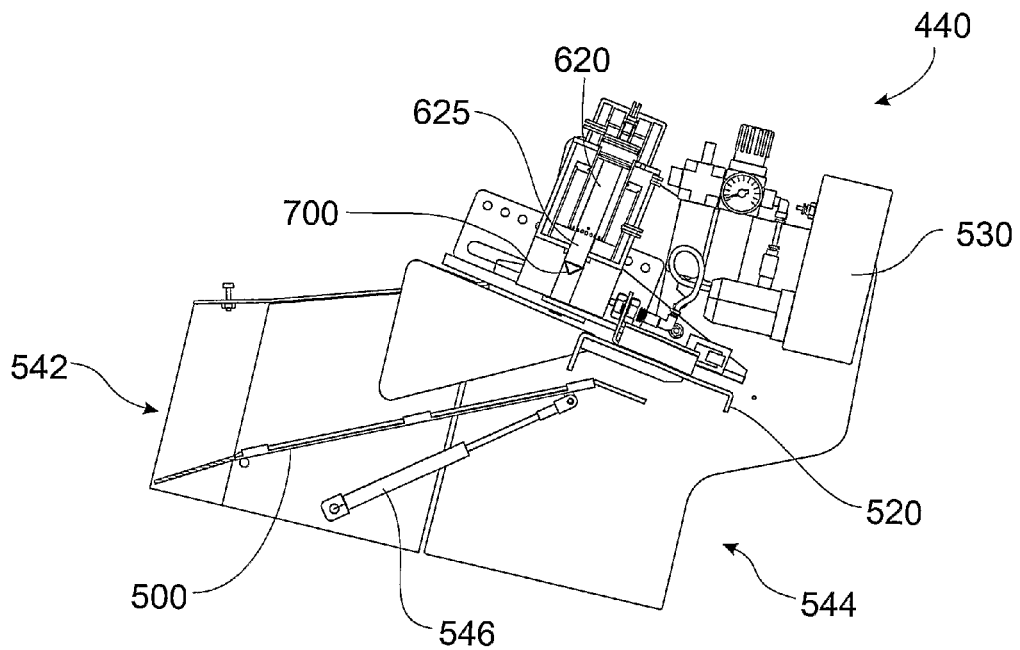
FIG. 15 is a partial cross-section view of the bleeder in a fourth position

When the piston 625 reaches the bottom of the cylinder 620, high-pressure air is passed through the control port 675 into the control chamber 670 to move the control piston valve 680 to the non-contact position as shown in FIG. 11.

The air is feed in the low-pressure chamber 635 through low-pressure inlet port 640 and passes through the ring of holes 655 located within the cylinder 620 to cause the piston 625 to be retracted within the cylinder 620. Air located within the cylinder 620 passes through the control piston valve 680 and through the outlet port 685 to complete operation.

The regulator 535 (FIGS. 5 to 7) supplies air using standard fittings. A pressure gauge 550 (FIGS. 5 to 7) indicates the pressure being supplied through the regulator 535.

The next step in the fish processing system 400 in the fish rotation device 100 located adjacent the exit 544 of the striker 420. Without reiterating the previously described fish rotation device 100, it can be appreciated that the fish rotation device herein described, is incorporated in the fish processing system 400. Subsequently, all fish that enter into the bleeder 430 are inverted (underside or stomach facing up).

FIGS. 12 to 15 show the operation of the bleeder 440 in the fish processing system 400. It should be appreciated that the bleeder 440 and the striker 420 are configured to be substantially similar. The notable difference is that the bleeder includes a piercer 700 mounted at the end of the piston 625. For clarity, like reference numerals used in FIGS. 5 to 11 refer to like parts in FIGS. 12 to 15.

The bleeder 440 operates by a fish being placed through the entrance 542 of the bleeder 440. The fish is oriented such that the ventral surface of the fish is upwardly facing. Once the fish is placed within the entrance 542, the trigger 520 is depressed and the bleeder 440 is activated. The piston 625 located within the cylinder 620 moves to the extended position and holds the fish in position for piercing. The piercer 700 penetrates the throat and gill opercula region of the fish, thereby causing the fish to bleed by severing major blood vessels in the throat and/or gill arches. To assist in aligning the fish's gills with the piercer 700, the bleeder 440 has a curved base which allows the fish to lie slightly tilted to one side. After piercing the fish, the base 500 moves downwardly causing the fish to pass through the exit 544 at the back of the bleeder 440. There is a slight delay between the piston 625 being fully extended and the base 500 pivoting downwardly to ensure that the piercer 700 penetrates the fish. The base 500 is then moved back to its original position to allow for another fish to pass through the entrance 542 into the bleeder 440.

The second fish guide 450 ends the fish processing system 400. The second fish guide 450 located adjacent the exit 544 of the bleeder allows passage of the fish for collection by an operator.

The fish processing system 400 that incorporates the fish rotating device 100, provides a streamline system in processing fish without compromising the quality of the fish. Since the fish is rotated and severed adjacent the throat region, minimal damage occurs to the edible portion of the flesh. Specifically, the fish rotating device 100 allows accurate delivery of the fish to the bleeder 430, hence improving the accuracy of the bleeder 430. This is highly advantageous since consumers prefer fish without superficial or structural damage. Given the severing is achieved with minimal effect upon the flesh, the fish processing system 400 provides an attractive alternative in the art of harvesting fishes.

Throughout the description and claims of this specification, the word "comprise" and variations of that word such as "comprises" and "comprising", are not intended to exclude other additives, components, integers or steps.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A fish rotation device, the device comprising:
   an entrance for receiving a fish,
   an intermediate section adjacent the entrance for rotating the fish about a longitudinal axis of the fish; and
   an exits adjacent the intermediate section has a cross-section shape that substantially conforms to the cross sectional shape of the fish.

2. The fish rotation device as recited in claim 1, wherein the device rotates the fish substantially about a longitudinal axis of the device.

3. The fish rotation device as recited in claim 1, wherein the intermediate section comprises an internal passage which is partially enclosed.

4. The fish rotation device as recited in claim 1, wherein the intermediate section comprises an internal passage which is fully enclosed.

5. The fish rotation device as recited in claim 1, wherein the device is oriented so that the entrance is above the exit.

6. A fish rotation device, the device comprising:
   a channel having an entrance for receiving a fish;
   the channel includes an intermediate section having an internal passage which causes a rotation of the fish substantially about a longitudinal axis of the channel;
   the channel includes an exit for delivering the rotated fish;
   wherein the entrance, the exit and the internal passage having a cross-sectional shape that substantially conforms to a cross-sectional shape of the fish.

7. The fish rotation device as recited in claim 6, wherein the device rotates the fish through 180 degrees between the entrance and the exit.

8. The fish rotation device as recited in claim 6, wherein the device rotates the fish through an angle in the range from about 90 to about 270 degrees.

9. The fish rotation device as recited in claim 6, wherein the device includes an entrance flange and an exit flange.

10. A fish processing system, the system comprising:
    a first fish guide having an entrance for receiving a fish;
    a striker coupled to the first fish guide, the striker having a first holder that holds and releases the fish and is configured to apply a blow to the fish;
    a channel coupled to the striker, the channel having an intermediate section that rotates the fish substantially about a longitudinal axis of the fish;
    a bleeder coupled to the channel, the bleeder having a second holder that holds and releases the fish and is configured to sever a blood vessel of the fish; and
    a second fish guide coupled to the bleeder, the second fish guide having an exit for delivering the fish.

11. The fish processing system as recited in claim 10, wherein the channel includes an entrance and an exit.

12. The fish processing system as recited in claim 11, wherein the entrance, the exit and the intermediate section have a cross-sectional shape that substantially conforms to a cross-sectional shape of the fish.

13. The fish processing system as recited in claim 10, wherein the striker is configured to stun the fish by applying a blow to the head of the fish.

14. The fish processing system as recited in claim 10, wherein the bleeder includes a piercer that severs the throat blood vessel and/or the gill arch of the fish.

15. The fish processing system as recited in claim 10, wherein the striker and the bleeder include a cylinder; and a piston, the piston movable between a retracted position and an extended position.

16. The fish processing system as recited in claim 15, wherein the striker and the bleeder include a trigger to cause the piston to be moved from the retracted position to the extended position.

17. The fish processing system as recited in claim 10, the striker and the bleeder include a head, a main body and a foot.

18. The fish processing system as recited in claim 17, wherein the head includes a control chamber that is linked to a control port, the control piston valve is mounted within the head and is movable between a contact position and a non-contact position.

19. The fish processing system as recited in claim 17, wherein the main body includes a low-pressure chamber that is linked to a low-pressure inlet port and a high-pressure chamber that is linked to a high-pressure inlet port.

20. The fish processing system as recited in claim 17, wherein the foot includes an aperture through which the piston extends when in the extended position.

* * * * *

UNITED STATES PATENT AND TRADEMARK OFFICE
CERTIFICATE OF CORRECTION

PATENT NO. : 7,575,508 B2
APPLICATION NO. : 12/282245
DATED : August 18, 2009
INVENTOR(S) : Bruce Goodrick Page 1 of 1

It is certified that error appears in the above-identified patent and that said Letters Patent is hereby corrected as shown below:

Column 7, Line 27, claim 1, replace "an exits adjacent the intermediate section" with --an exit adjacent the intermediate section--.

Signed and Sealed this

Seventeenth Day of November, 2009

David J. Kappos
*Director of the United States Patent and Trademark Office*